(12) United States Patent
Hemingway et al.

(10) Patent No.: US 11,870,807 B2
(45) Date of Patent: Jan. 9, 2024

(54) SYSTEM AND METHOD FOR PHISHING EMAIL TRAINING

(71) Applicant: JPMORGAN CHASE BANK, N.A., New York, NY (US)

(72) Inventors: Brian E. Hemingway, Sykesville, MD (US); Hayley Newman, Lorong (SG); Todd Arnts, New York, NY (US); Kimm Eagle, New York, NY (US); Kai Yu, New York, NY (US); Roger Rex Allen, III, New York, NY (US); Julian Boddy, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 182 days.

(21) Appl. No.: 17/091,565

(22) Filed: Nov. 6, 2020

(65) Prior Publication Data

US 2021/0152596 A1 May 20, 2021

Related U.S. Application Data

(60) Provisional application No. 62/937,719, filed on Nov. 19, 2019.

(51) Int. Cl.
*H04L 29/06* (2006.01)
*H04L 9/40* (2022.01)
*H04L 51/08* (2022.01)
*G06N 20/00* (2019.01)
*H04L 51/212* (2022.01)
*H04L 67/50* (2022.01)

(52) U.S. Cl.
CPC .......... *H04L 63/1483* (2013.01); *G06N 20/00* (2019.01); *H04L 51/08* (2013.01); *H04L 51/212* (2022.05); *H04L 67/535* (2022.05)

(58) Field of Classification Search
CPC ... H04L 63/1483; H04L 51/08; H04L 51/212; H04L 67/535; H04L 63/1433; G06N 20/00
See application file for complete search history.

(56) References Cited

U.S. PATENT DOCUMENTS

| | | | | |
|---|---|---|---|---|
| 3,582,468 | A * | 6/1971 | Birnbaum et al. | C12P 19/34 435/270 |
| 8,719,940 | B1 * | 5/2014 | Higbee | H04L 63/1483 709/206 |
| 9,325,730 | B2 * | 4/2016 | Higbee | H04L 63/1466 |
| 10,243,904 | B1 * | 3/2019 | Wescoe | G06F 21/566 |

(Continued)

*Primary Examiner* — David P Zarka
*Assistant Examiner* — Wuji Chen
(74) *Attorney, Agent, or Firm* — GREENBERG TRAURIG LLP

(57) ABSTRACT

Systems and methods for phishing email training are disclosed. In one embodiment, in an information processing apparatus comprising at least one computer processor, a method for phishing email training may include: (1) receiving a target difficulty level, a target population, and a plurality of parameters for a test phishing email; (2) selecting a plurality of test email components from a library of test email components based on the parameters and the target difficulty level; (3) generating the test phishing using the selected test email components, wherein the test phishing email may include at least one of a hyperlink and an attachment; and (4) disseminating the test phishing email to the target population.

19 Claims, 6 Drawing Sheets

(56) References Cited

U.S. PATENT DOCUMENTS

| | | | |
|---|---|---|---|
| 10,917,429 B1* | 2/2021 | Patton | H04L 63/1483 |
| 11,297,094 B2* | 4/2022 | Huda | H04L 63/1483 |
| 2005/0188024 A1* | 8/2005 | Singer | H04L 51/48 |
| | | | 709/206 |
| 2006/0031325 A1* | 2/2006 | Cheng | H04L 51/212 |
| | | | 709/206 |
| 2011/0161433 A1* | 6/2011 | Liu | G06Q 10/107 |
| | | | 709/206 |
| 2012/0254333 A1* | 10/2012 | Chandramouli | G06F 40/10 |
| | | | 709/206 |
| 2012/0258437 A1* | 10/2012 | Sadeh-Koniecpol | G06F 21/56 |
| | | | 434/362 |
| 2013/0132854 A1* | 5/2013 | Raleigh | G06F 3/0482 |
| | | | 715/738 |
| 2013/0138428 A1* | 5/2013 | Chandramouli | G06F 40/30 |
| | | | 704/9 |
| 2013/0276125 A1* | 10/2013 | Bailey | G06F 21/46 |
| | | | 726/25 |
| 2015/0287336 A1* | 10/2015 | Scheeres | G09B 5/02 |
| | | | 434/156 |
| 2016/0330238 A1* | 11/2016 | Hadnagy | H04L 63/1483 |
| 2016/0344770 A1* | 11/2016 | Verma | H04L 51/42 |
| 2017/0251009 A1* | 8/2017 | Irimie | H04L 63/1483 |
| 2018/0041537 A1* | 2/2018 | Bloxham | H04L 63/0263 |
| 2018/0219830 A1* | 8/2018 | O'Brien | H04L 51/48 |
| 2018/0365429 A1* | 12/2018 | Segal | H04L 67/535 |
| 2019/0020682 A1* | 1/2019 | Edwards | H04L 51/212 |
| 2019/0065742 A1* | 2/2019 | Humphries | G06N 20/00 |
| 2019/0173918 A1* | 6/2019 | Sites | G06N 3/084 |
| 2019/0173919 A1* | 6/2019 | Irimie | G06N 3/006 |
| 2019/0245894 A1* | 8/2019 | Epple | G06F 21/56 |
| 2019/0260804 A1* | 8/2019 | Beck | G06F 18/232 |
| 2020/0366712 A1* | 11/2020 | Onut | H04L 63/1416 |
| 2021/0058428 A1* | 2/2021 | Arlitt | H04L 63/1416 |
| 2021/0075828 A1* | 3/2021 | Kras | H04L 51/42 |
| 2021/0152596 A1* | 5/2021 | Hemingway | H04L 63/1433 |
| 2021/0259615 A1* | 8/2021 | Hendler | G16H 20/70 |
| 2021/0273960 A1* | 9/2021 | Humphrey | H04L 63/1425 |
| 2021/0273961 A1* | 9/2021 | Humphrey | H04L 63/1416 |
| 2021/0344713 A1* | 11/2021 | Kras | H04L 51/212 |
| 2021/0367958 A1* | 11/2021 | Hariri | H04L 63/1416 |
| 2021/0390181 A1* | 12/2021 | McClay | G06N 20/00 |
| 2021/0407308 A1* | 12/2021 | Brubaker | G06Q 10/06393 |
| 2022/0164476 A1* | 5/2022 | Barday | G06Q 10/107 |
| 2022/0166784 A1* | 5/2022 | Patton | H04L 63/1425 |
| 2022/0201018 A1* | 6/2022 | Sites | H04L 63/1416 |
| 2022/0201037 A1* | 6/2022 | Onut | G06N 20/00 |
| 2022/0377101 A1* | 11/2022 | Kras | H04L 63/1483 |
| 2022/0394052 A1* | 12/2022 | Grossman-Avraham | |
| | | | G06F 21/50 |
| 2023/0171268 A1* | 6/2023 | Marwah | H04L 63/1433 |
| | | | 726/22 |

* cited by examiner

| Section | Subsection | Category | Example | Description | Rating |
|---|---|---|---|---|---|
| Header | Sender Name | Real / Spoofed Sender (Person, Company, Entity) | IT Dept. / company it dept. | A real company name or appearance of, adds to the realism of the email. The average users typically takes emails on face value and do look into the actual address of the email either by expanding the Sender Information or copying / pasting information into a text document to check for spoofing | 5 |
| | | Generic but Realistic Sender (Person, Company, Entity) | IT Department / John Doe | Users can be easily fooled by commonly used terminology that can relate to their personal or professional life. The average user still does not conduct enough due diligence to research the sender or lookup the domain of the email to see who or what actual owns that email address | 3 |
| | | Unrealistic Sender (Person, Company, Entity) | Johnny Appleseed / President of USA / CEO of ABC Corp. | Users are less likely to trust an email if it comes from someone they do not know or have never communicated with or have heard to be fake | 1 |
| | | No Sender Name | <Blank> | The average user would most likely look at the email address to determine if they can trust the email. No sender name does not likely lead the user to trust or not trust the email in any significant way | 0 |
| | Sender Email Address | Real / Spoofed Email Address | itdept@company.com / gregwhipple@gmail.com / itdetp@company.com | A real company email or appearance of, adds to the realism of the email. The average users typically takes emails on face value and do look into the actual address of the email either by expanding the Sender Information or copying / pasting information into a text document to check for spoofing | 5 |
| | | Real Domain, Fake Sub-Domain in Email Address | itdept@company.support.com / gregwhipple@gmail.tmail.com | Users can be easily fooled by commonly used terminology that can relate to their personal or professional life. The average user still does not conduct enough due diligence to research the sender or lookup the domain of the email to see who or what actual owns that email address. Email vs. Sender name appears a bit more legitimate if spoofed well | 4 |
| | | Generic but Realistic Email Address that Matches Sender Name | IT@corporateintranet.com | Users are more likely to trust an email if there enough flags that relate to each other such as the email domain and name of sender. Most legitimate emails match the Company Name with the domain in the email address | 4 |
| | | Generic but Realistic Email Address | itdept@corporateintranet.com / gregwhipple@cheapseatsxpress.com | Users can be easily fooled by commonly used terminology that can relate to their personal or professional life. The average user still does not conduct enough due diligence to research the sender or lookup the domain of the email to see who or what actual owns that email address | 3 |
| | | Unrealistic Email Address | abc@endtrust.net / support@endtrust.net / trust@nevertrust.net | A completely unknown and awkward email address is a well-known sign that the email is not legitimate, especially if it has no relation to the Sender Name | 1 |
| | Subject Line | Realistic, Timely or Specific Subject Line with Emotional Trigger or Personalization | Urgent: Password is about to Expire / Request for Access: / Holiday Party Invitation | The average user is more likely to engage with an email if there is a strong emotional trigger in the subject line that prompts them to open the email. Additionally if the email is personalized and references a current event or likely current event, the user feels a sense that they should read the email and potentially respond as needed | 4 |
| | | Realistic, Timely or Specific Subject Line | Benefits Open Enrollment Time / 2018 Olympics / Happy Hour Wednesday | Users who may be reading through emails fast may overlook the generic feel of an email and use filter words to make the email appear legitimate. Phantom context clues can lead a user to click | 3 |
| | | Generic Subject Line with Emotional Trigger or Personalization | Greg, Can you look at this? / See attachment for important information | Unexpected or generic subject lines that still come with a curious subject line can peak a user's interest just enough to engage with an email. It is recommended that users avoid these emails but also practice good email writing but making their own subject lines clear and specific to the recipient | 3 |
| | | Generic Subject Line | Report has been released / Financial Report 2018 / Latest Threats | Unexpected or generic subject lines without any emotional verbiage are more likely questioned and deemed suspicious by the average user. It most cases these are avoided | 1 |

FIGURE 2A

| | | | | | |
|---|---|---|---|---|---|
| Body | Email Design | External: Email Appears Professionally Designed | Use a well-known and recognizable color template with CSS tables, charts and uniform fonts/sizes | Users are more likely to trust an email if it appears time had be taken to professionally craft the design of the email and make it appear more legitimate. The average user is still unlikely to do their due diligence to ensure the email is coming from a legitimate source | 4 |
| | | Internal: Email template matches internal templates | No differentiation between other internal templates used | | 5 |
| | | Internal: Almost matches templates | Slight differentiation between internal templates used | Users are more likely to trust an email if it appears time had be taken to professionally craft the design of the email and make it appear more legitimate. The average user is still unlikely to do their due diligence to ensure the email is coming from a legitimate source | 4 |
| | | External: Email Contains Average CSS Design | Use a well-known and recognizable color template with CSS tables, charts and uniform fonts/sizes | Users are more likely to trust an email if it appears time had be taken to professionally craft the design of the email and make it appear more legitimate. The average user is still unlikely to do their due diligence to ensure the email is coming from a legitimate source | 3 |
| | | Internal: Contains several elements of a internal email | Some elements are inline with internal templates used | | 3 |
| | | External: Email Contains CSS Script but Poorly Designed | CSS is clearly used to design the email but overall the design is sloppy with mismatching color schemes and misaligned tables and text | This would appear more as a SPAM email to the average user and most likely to be ignored but coupled with other factors it could appear legitimate and rationalized that the sender was lazy with their code | 2 |
| | | Internal: Poorly Mimicks Internal Templates | | User should recognize as atypical | 0 |
| | | External: Email is Plain-Text with average fonts and color schemes / Could possibly be sent internally at | Plain text email like an internal you send to a colleague | Email like this does not have validity as far as being legitimate or being spam | 1 |
| | | External: Email is Plain-Text with abnormal fonts, color schemes, image placement, etc. / Highly unlikely to be sent internally at | Plain text email that looks odd like random highlighted words or use of multiple abnormal fonts | Phishing campaigns typically use plain text emails that simply look odd with random use of colors, fonts and images | 0 |
| | Greeting | Personalized Greeting where one would be expected (external email from an individual) | Hi Greg / Dear Greg /, | A personalized greeting should not add much weight to the legitimacy of an email as it is easy to do but does illicit a more personal connection to the email for the recipient | 2 |
| | | Personalized Greeting where one would NOT be expected (internal broadcast email) | Hi Greg / Dear Greg /, | internal broadcast communications do not include personalized greetings, and therefore having one would be a red flag / should not add weight to the legitimacy of the email | 0 |
| | | Generic Greeting where one would be expected (non-newsletter external email, or internal email from an individual) | To Whom It May Concern / Dear User / Hello, | Generic intros are a good tell than the recipient should ignore the email as the sender took no time to specifically address the email to his list of recipients. This closer to a SPAM email or junk email such as To Our Current Neighbor | 1 |
| | | Generic Greeting where one would NOT be expected (newsletter-type external email, or internal broadcast email) | To Whom It May Concern / Dear User / Hello, | Generic intros present in an email that would not normally have one are a tell that the sender is not familiar with internal culture or is intentionally trying to grab your attention in a situation that wouldn't normally require it. | 0 |
| | | No Greeting | <Blank> | This may be found in a newsletter centric email or large broadcasted email. These emails should be ignored and users should attempt to block these senders as at best these emails are SPAM/waste of time related or worst case they are part of a large phishing campaign to gather credentials | 0 |
| | Body | Subject Matter of the Email | Your password is about to expire, follow this steps to reset / Your year end benefits are now in open enrollment period | This category is very much up to the consideration of the email developer and can change based on the recipient. It is at this point the recipient is at the mercy of the content that the sender implemented. It can be very strong, realistic and personal and be rated anywhere from a 1 to a 5. This coupled with other flags will determine the overall rating of the email | 1-5 |
| | Footer | External: Personalized Signature with Contact Information | Netflix Inc. 111 Park Ave. support@Netflix.com | A personalized signature will add weight to the email if the information matches the information the recipient would expect to see for the Sender. The recipient should avoided the body of the email unless they are absolutely sure the email is from a trusted source and they were expecting the email. | 4 |
| | | External: Personalized Signature with No Contact Information | Netflix Inc. 111 Park Ave. | A personalized signature will add weight to the email if the information matches the information the recipient would expect to see for the Sender. The recipient should avoided the body of the email unless they are absolutely sure the email is from a trusted source and they were expecting the email. | 3 |
| | | External: Personalized Signature with Obvious Misinformation | Netflix Inc. Tel Aviv, UAE support@netmovie.com | If well known entities are the Sender but the contact information is known to be wrong it is a definite indication of a phishing campaign | 1 |
| | | Internal: Signature is appropriate for the type of email being sent | E.g. senior leader signature image and date/target footer on a broadcast email / name, phone, LOB and email address on an email from an individual | If the signature type and style is reflective of the type of email being sent internally, this adds weight of legitimacy. | 5 |
| | | Internal: Signature is not typical for the type of email being sent. | Signature info is present, but is atypical of internal emails. | | 1 |

FIGURE 2B

| | | Risk Factor | | | |
|---|---|---|---|---|---|
| Header | Subject Line | Strong, Emotional Trigger (Urgency, Congratulations, Request Help) | URGENT / Congratulations / Request for Information / Immediate Change | Emotional language in the subject line is likely to at least get the recipient to open the email at which time they are at the mercy of the sender's content and social engineering skill level | +0.5 |
| | | Minor, Emotional Trigger (Curiosity) | Testing: / See Inside / Review: | CurioUs language in the subject may be enough for some users to click into the email but heavily based on the curiosity level of the recipient | +0.25 |
| | | Obvious Spelling / Grammar Mistake | URGENT -> UGENT | Obvious spelling or grammar mistakes in the subject line should immediately put the user on edge and allow them to research the sender to see if the email is SPAM or potentially worse | -0.5 |
| | | Use of Fraud Related Terminology or Request for User Personal Information | Bitcoin / Ransomware / DDoS / Western Union / Money Transfer / Russia / Nigerian | Any terminology that is frequently used in phishing campaigns should be immediately ignore especially if coupled with an aggressive tone or plea for help | -1 |
| | | Contains FW:, RE: or <Blank> | FW: Is this mail for you / RE: Can you look at this? / Fw: / Re: | If subject line provides little to no information and appears as part of another email chain you are not previously on then the user should be suspicious and if appears from a colleague, reach out to that colleague by another means of communication | +0.5 |
| Body | Body | Strong, Emotional Trigger (Urgency, Congratulations, Request Help) | URGENT / Congratulations / Request for Information / Immediate Change | Any mention of a strong emotional trigger can grab the user back in and potentially make them click a link to email. Think a loved one in financial trouble and potential personal backlash if the user does not take action | +0.25 per |
| | | Obvious Spelling / Grammar Mistake | Caution -> Cau8on: | Grammar and spelling mistakes are typical signs of SPAM or phishing and should add to the user's suspicion level | -0.25 per |
| | | Use of Fraud Related Terminology or Request for User Personal Information | Bitcoin / Ransomware / DDoS / Western Union / Money Transfer / Russia / Nigerian | Any terminology that is frequently used in phishing campaigns should be immediately ignore especially if coupled with an aggressive tone or plea for help | -0.5 per |
| | | Use of Real Company Logos | Netflix Logo with a similar design of a real Netflix email | Real logos couple with real company information is a deadly combo for a successful phishing campaign. The average user is most likely to be taken advantage of | +0.5 per |
| | | Use of Fake Company Logos or Mimicked Real Company logos | Made up company with a believable logo or an attempt to make a real Netflix logo with noticeable differences | Fake logos can be successful if the user is gullible or lazy | +0.25 per |
| | | Use of Real Recipient Information Other Than Email or Name in Greeting or Footer | Age / Time with the Firm / Role at the Firm / Accurate Deadline for a Password Reset | Real facts about the recipient add to validity of the email by suggesting that the user has interacted with the past and probably by another means of communication. Think email after the first visit to a new doctor's office | +0.25 per |
| | Hyperlink | Hyperlinks are Obfuscated | www.google.acme.com --- Hidden As --> Click Here! | Obfuscated links can trip up any user if they do not know to check the actual link before clicking by hovering over it. The average user most likely knows about this tactic but Click Here is also very convenient | +0.10 per unique link |
| | | Hyperlinks Appear Legitimate After User Hovers with Mouse | www.google.supporter.com vs. www.google.com or www.g.oogle.com/jwfbef3r43r3r | The average user should know to hover over any suspicious links and if a link is not obfuscated, they should also know how to dissect a URL or at least notice an abnormal one. With that if a URL is very similar to a real, expected URL, it can trip up the best users | +0.10 to 0.25 per unique link |
| | | Hyperlink uses HTTP | http:// vs. https:// | HTTP is a strong indicator that a link should not be trusted as it is insecure | -1 |
| Attachment / Body | Attachment | External Email Contains an Attachment (Standard / In-Line Image) | Standard / In-Line Image Attachment | Users should be suspicious if an external email is delivered with an attachment. Unfortunately, attachments are seen as a normal function of an email and the average user is likely to open if they seemingly trust the sender | -0.25 |

FIGURE 3

SYSTEM AND METHOD FOR PHISHING EMAIL TRAINING

RELATED APPLICATIONS

This application claims priority to, and the benefit of, U.S. Provisional Patent Application Ser. No. 62/937,719, filed Nov. 19, 2019, the disclosure of which is hereby incorporated, by reference, in its entirety.

BACKGROUND OF THE INVENTION

1. Field of the Invention

Embodiments generally relate to systems and methods for phishing email training.

2. Description of the Related Art

Organizations often train their employees to recognize phishing email attacks by creating awareness of these threats. A common way of doing this is to periodically send test phishing emails to employees and monitoring the results, such as the failure rate (i.e., the number of employees that clicked on the link) and the reporting rate (i.e., the number of employees that reported the email to the Information Technology (IT) department). The test phishing emails, however, vary in difficulty, which can lead to different failure and response rates, which makes it difficult, if not impossible, to accurately compare the performances from different campaigns.

SUMMARY OF THE INVENTION

Systems and methods for phishing email training are disclosed. In one embodiment, in an information processing apparatus comprising at least one computer processor, a method for phishing email training may include: (1) receiving a target difficulty level, a target population, and a plurality of parameters for a test phishing email; (2) selecting a plurality of test email components from a library of test email components based on the parameters and the target difficulty level; (3) generating the test phishing using the selected test email components, wherein the test phishing email may include at least one of a hyperlink and an attachment; and (4) disseminating the test phishing email to the target population.

In one embodiment, the difficulty level may be selected using a phishing difficulty algorithm.

In one embodiment, the plurality of parameters may include at least one of a delivery time, a day of delivery, and an email component to test.

In one embodiment, the test email components are selected using a trained machine learning model.

In one embodiment, a subject of the test phishing email may be selected based on a job function for the target population of the test phishing email.

In one embodiment, the target population may be identified based on a job function, may be based on a response to a prior test phishing email, etc.

In one embodiment, the method may further include monitoring a response to the test phishing email from the target population; identifying one or more automated action to take based on the response of at least one user in the target population; and executing the automated action.

In one embodiment, monitoring a response to the test phishing email from the target population may include: for each user in the target population, tracking whether the test phishing email was opened and at least one of a type of device used to open the test phishing email, a user location when the test email was opened, whether the user clicked on the hyperlink or attachment, and an amount of time spent reviewing the test phishing email.

In one embodiment, the method may further include tracking hovers over test email components in the test phishing email.

In one embodiment, the automated action may be identified in response to a test threshold is reached.

In one embodiment, the test threshold may be based on a security level access for the user and a user susceptibility level.

In one embodiment, the automated action may include generating and sending a second test phishing email, providing the user with additional training, sandboxing a user email inbox, etc.

In one embodiment, the method may further include updating a machine learning model based on the responses.

According to another embodiment, a system for generating test phishing emails with a target difficulty level may include: an electronic device comprising at least one computer processor and executing a computer program; a first database comprising a library of email components; a second database comprising organizational information for an organization; and a third database comprising a phishing difficulty algorithm. The computer program may receive a target difficulty level, a target population from the organizational information, and a plurality of parameters for a test phishing email; using a trained machine learning model, may select a plurality of test email components from the library of test email components based on the parameters and the target difficulty level and using the phishing difficulty algorithm; may generate the test phishing using the selected test email components, wherein the test phishing email may include at least one of a hyperlink and an attachment; may disseminate the test phishing email to the target population; may monitor a response to the test phishing email from the target population; may identify one or more automated action to take based on the response of at least one user in the target population; and may execute the automated action.

In one embodiment, for each user in the target population, the computer program may track whether the test phishing email was opened and at least one of a type of device used to open the test phishing email, a user location when the test email was opened, whether the user clicked on the hyperlink or attachment, and an amount of time spent reviewing the test phishing email.

In one embodiment, the computer program may track hovers over test email components in the test phishing email.

In one embodiment, the automated action may include sandboxing a user email inbox.

BRIEF DESCRIPTION OF THE DRAWINGS

In order to facilitate a fuller understanding of the present invention, reference is now made to the attached drawings in which:

FIGS. 2A and 2B depict an exemplary pre-index scoring scheme according to one embodiment;

FIG. 3 depicts an exemplary index scoring scheme according to one embodiment;

DETAILED DESCRIPTION OF PREFERRED EMBODIMENTS

Embodiments generally relate to systems and methods for phishing email training. In one embodiment, a Phishing Difficulty Algorithm, or PDA, may enable accurate comparison of the relative difficulty level of unique test emails is disclosed. The PRS allows performance to be measured across multiple campaigns and target performance levels to be established.

Figure 1:
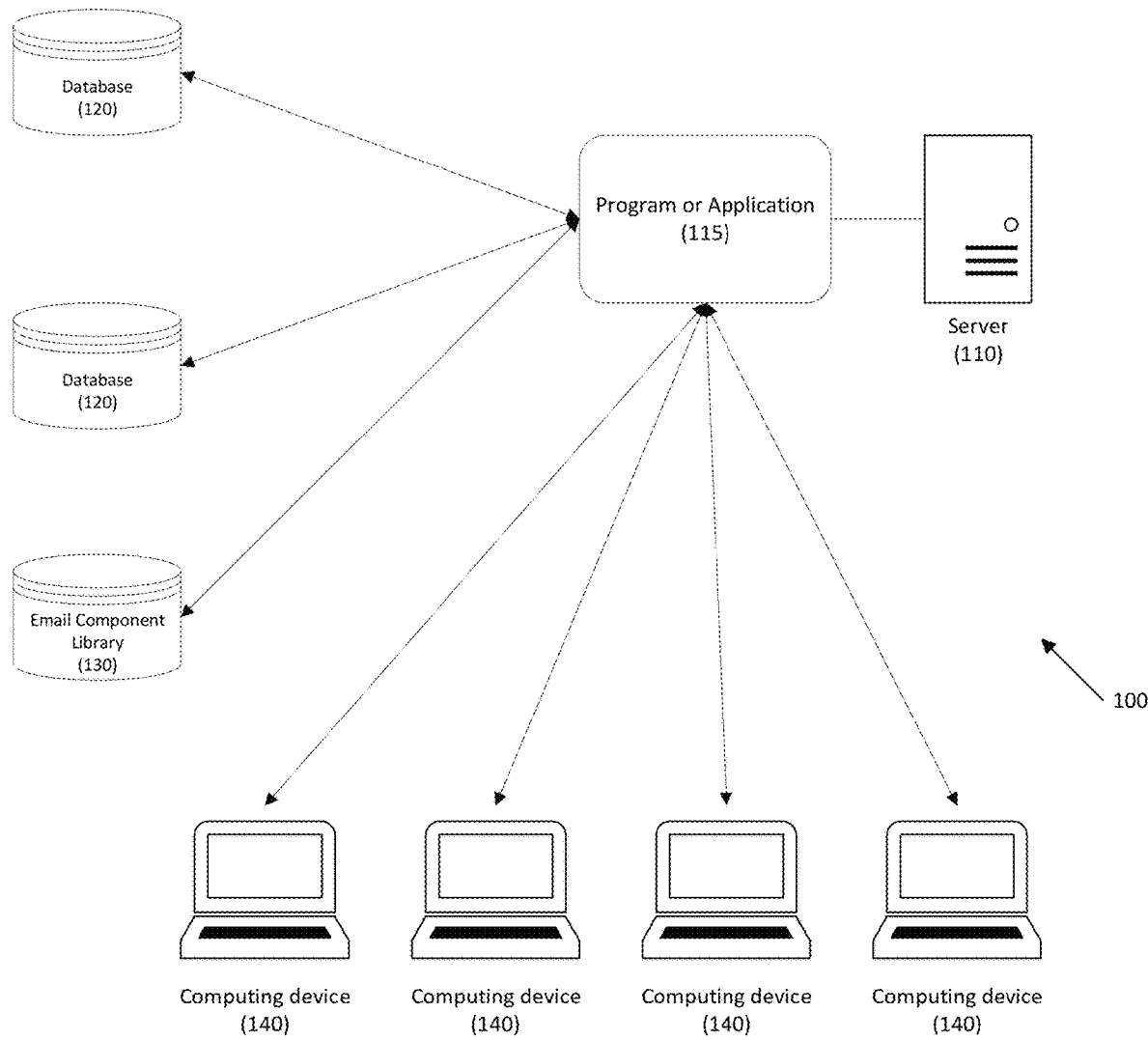
FIG. 1 discloses a system for phishing email training according to one embodiment.

Referring to FIG. 1, a system for phishing email training email is disclosed. System 100 may include server 110 that may host computer program or application 115 that may run a program for phishing email training Program 115 may interact with one or more database 120 that may store templates for phishing emails, prior failure/response rates, etc.

In one embodiment, database(s) 120 may store organizational information, including an org chart, user information (e.g., line of business, job responsibilities, etc.), user location information, historical user phishing emails interactions (e.g., types of phishing emails that users have responded to in the past), etc. Any suitable information that may focus and/or tailor training emails to an individual and/or group of individuals may be used as is necessary and/or desired.

In embodiments, database(s) 120 may also contain real world phishing email click and reporting data to identify adversary phishing email themes, lures, and/or attachments. This may also include other social engineering attack vectors, such as voice phishing ("vishing"), SMS phishing ("smishing"), and any other suitable threat intelligence risk indicators.

Additionally, suspicious email reporting rates also provide a metric to determining the difficulty rating of a phishing email test. For example, the percent of a population (e.g., employees) that report a phishing attempt without clicking or forwarding to another user may be stored, and a reporting user's history may be used to determine the difficulty of the test.

Program 115 may interact, directly or indirectly (e.g., through an email server or similar system), with organization electronic devices 140 that may receive test phishing emails and have the user's interaction with those emails monitored.

In one embodiment, program 115 may create test phishing emails to meet a specified difficultly level. For example, program 115 may receive one or more parameter (e.g., a user id, line of business, etc.), a difficulty (e.g., high-medium-low, etc.), and may generate a test phishing email for one or more user. For example, program 115 may access user information to identify the user's job responsibilities to generate a test phishing email that would be relevant to the user's work if such were warranted based on the difficulty level. As another example, the user's past interactions with test phishing emails may be used to generate a test phishing email that may be targeted to the user's past weaknesses (e.g., the user does not identity a test phishing email from a masked email address as being suspicious). Any other information that may be used to generate a test phishing email to one or more users may be used as is necessary and/or desired.

In one embodiment, based on the difficulty level received, program 115 may use a phishing difficulty algorithm to select email components from, for example, email component library 130. In one embodiment, the phishing difficulty algorithm may be stored in memory, in database 120, etc. Email component library 130 may include components such as subjects, incorrect logos, email addresses, email content with cues such as misspellings, grammatical issues, etc. In one embodiment, the components in email component library 130 may be collected from actual phishing emails, or they may be synthetic. Any suitable source of components may be used as is necessary and/or desired.

In one embodiment, a pre-index scoring scheme, such as that depicted in FIGS. 2A and 2B, may be used to select components based on their weighting. An example of an index scoring scheme is provided in FIG. 3.

In one embodiment, program 115 may predict an expected click-through rate for each email using, for example, a predictive analysis framework. The predicted click-through rate may be presented at the individual, group, and/or organizational level. The predicted click-through rate may be calculated based on, for example, the adjusted score, past user interactions.

An illustrative click-through rate is provided below:

|  | Email Difficulty | | | | | |
| --- | --- | --- | --- | --- | --- | --- |
|  | Low | | Medium | | High | |
| Email Post Index Score | <0 | 1 | 2 | 3 | 4 | >5 |
| Click Rate | 2% | 5% | 10% | 15% | 20% | 20% |
| Report Rate | 35% | 30% | 20% | 10% | 10% | 10% |

The predicted click rate may be calculated based on, for example, the adjusted score, past user interactions, holidays, world events, time of day, and receiving emails on desktop versus mobile devices. Planners can also consider combining a phishing test with another social engineering attack vector (e.g., vishing, etc.) which would impact the expected click rate but provide realistic training based on real world adversary TTPs. For example, an employee who routinely interfaces with external entities would be more susceptible to a test from a supposed client/prospect than an employee who only interfaces with other employees. Furthermore, new members of the organization are more susceptible to clicking suspicious emails due to minimal exposure to email norms and firmwide process/procedures.

In one embodiment, the adjusted score or any intermediate score, expected click-through rate, and actual click-through may be presented for individual users, lines of business, or for the organization. In one embodiment, these metrics may be used to identify weaknesses/vulnerabilities, such as employees failing to recognize a certain kind of phishing email, and additional training may be automatically triggered.

Program 115 may automatically assign additional training, execute one or more corrective and/or precautionary measures, etc. based on each user's click-through. For example, after a threshold of click-throughs is reached, which may vary based on the test phishing email difficulty, the user's response may be monitored, additional email filters may be applied to the user's incoming emails, the user's email inbox may be sandboxed, etc.

Embodiments may create a holistic social engineering metric that includes phishing, vishing, swishing, etc. that may feed into other user behaviour control monitoring.

In embodiments, phishing tests may be developed in four stages: plan, design, conduct, and assess. The planning stage begins with campaign ideation which includes discussion around campaign dates (e.g., campaign launch, campaign end, data cut-off, etc.), goal and usefulness (awareness around the threat of phishing and/or specific adversary tactics, techniques, procedures, etc.), theme (ideally derived from a real threat, recent news, intelligence reporting), lure (e.g., authoritative, excitement, fear, curiosity, etc.), and difficulty (e.g., how real should it look: template, sender, URL, subject line, etc.). Additionally, variants may be provided that test whether users are more likely to click on attachments versus links, etc.

The second stage in the planning process is the design phase in which the campaign is created in a vendor or in-house phishing platform. The campaign name and dates (e.g., start date, data cut off, etc.) are determined and set in the platform. Planners may consider the timing of phishing emails to ensure tests are sent during realistic days/hours to maximize the effectiveness of the test while maintaining realism with real-world threats.

Next, the phishing test may be rated during the design phase using an algorithm.

This may be followed by the creation of the clicker landing page that matches the theme of the email (e.g., ransomware, credential harvester, etc.) and match real world phishing emails.

In embodiments, an up-to-date organizational address book may be retrieved so that the test is sent to the current workforce.

Fourth, planners should ensure that the email test domain is allow listed to ensure users receive the test, and may be required to obtain approval from leadership to conduct the test and coordinate the test with the appropriate subject matter experts as required to minimize operational impact to the organization.

In the conduct phase, the phishing test is executed. Planners monitor the test to obtain preliminary indicators of recipients, reporters, and any issues with the clicker landing pages loading, etc.

In the assess phase, planners download the click reporting, and email forward data from vendor or internal databases in order to produce reports for senior leaders and key stakeholders. Other metrics, such as hover time, open rate statistics, etc. may be analysed for future testing, and may be used to train a machine learning engine and/or artificial intelligence software.

Figure 4:
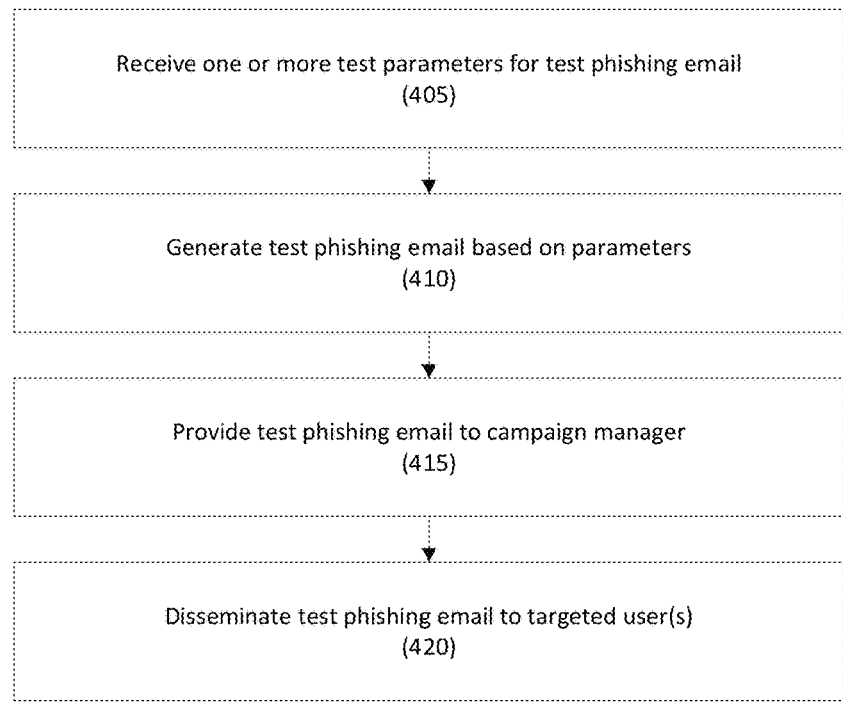
FIG. 4 depicts a method for test phishing email generation according to one embodiment.

Referring to FIG. 4, a method for generating a test phishing email with a desired rating is disclosed according to one embodiment. In one embodiment, a campaign manager may begin the process by drafting campaign scope and objectives, such as a difficulty level for the test phishing email, time of day (e.g., to target review of the test phishing email when users are out of the office and using mobile electronic devices, identity one or more users to receive the test phishing email, etc. This may then be approved by the organization's management.

In one embodiment, the campaign objectives may also identify a specific area to test, such as misspellings. In another embodiment, the area to test may be based on past user interactions, and may be based on the individual or group level.

In step 405, one or more test parameters for the test phishing email may be received. For example, a user may specify a difficulty score, one or more components or themes for testing in the emails, etc. In one embodiment, a target population (e.g., a single user, a group of users, users within a business unit, all users within the organization, a random sampling of users, etc.) may be identified.

For example, a user, such as an exercise planner, may determine a desired Pre-index score difficulty level of the phishing test email (e.g., from 0-5, how "real" or believable the email should look). The user may then be presented with a menu of options of the components that can be manipulated to achieve that Pre-index score level of difficulty. The user may then choose the options the best suit the purposes of this exercise.

In one embodiment, the test phishing emails may be targeted to users that have had difficulty identifying phishing emails, to those that have undergone remedial training, etc.

In one embodiment, a delivery time for the test phishing email may be specified. In one embodiment, the delivery time may be selected to target the users while they are in the office, while they are out of the office and using mobile devices, in the evening, over the weekend, etc.

In one embodiment, the target's job functionality may be taken into account when developing a phishing test. For example, the phishing test language may be changed based on job function, branding, device being delivered to (e.g., laptop, mobile device, etc.), country and regional considerations, etc. to increase resonance of the email with the target(s).

In step 410, the test email may be generated. For example, using the menu selections, the program may generate an email template from a pre-filled library of template and component options. The user may then manipulate the template in small ways that affect the Index score (e.g., adding 3 typos to increase detectability by reducing "believability"). The Pre-index and Index scores may be added together to achieve a Post-index score, or the overall level of difficulty of the template.

In embodiments, based on the identity of the targeted users, the system may identify each user's job responsibility so that the test phishing email may be relevant to the user's job, if desired. It may further identify other members or the organization that may send the user emails in order to identify a "source" for the test phishing email. It may further identify past successes and failures for each user with regard to test phishing emails.

In one embodiment, a library of email components may be accessed, and the test email may be assembled according to the difficulty score using, for example, a phishing difficulty algorithm. Machine learning may be used to confirm that the email does not include inconsistent components for the selected components.

In one embodiment, the test phishing email may include one or more hyperlinks that a user may select or click on if the user does not recognize that the test phishing email is a test phishing email. The hyperlinks may record the users' interactions with the email. In embodiments, whether the user reviewed the email, downloaded any images, attempted to open any attachments, areas/time that the user hovered over, etc. may be collected.

In step 415, the test phishing email may be provided to a campaign manager for dissemination and, in step 420, the campaign manager may disseminate the test phishing email to the targeted user(s) based on the parameters.

In one embodiment, the test phishing email may be queued until a certain condition is met. For example, if the goal is to test how a user responds when the user is out of the office, a check may be made to confirm that the user is not on an office network before the test phishing email is sent.

Figure 5:
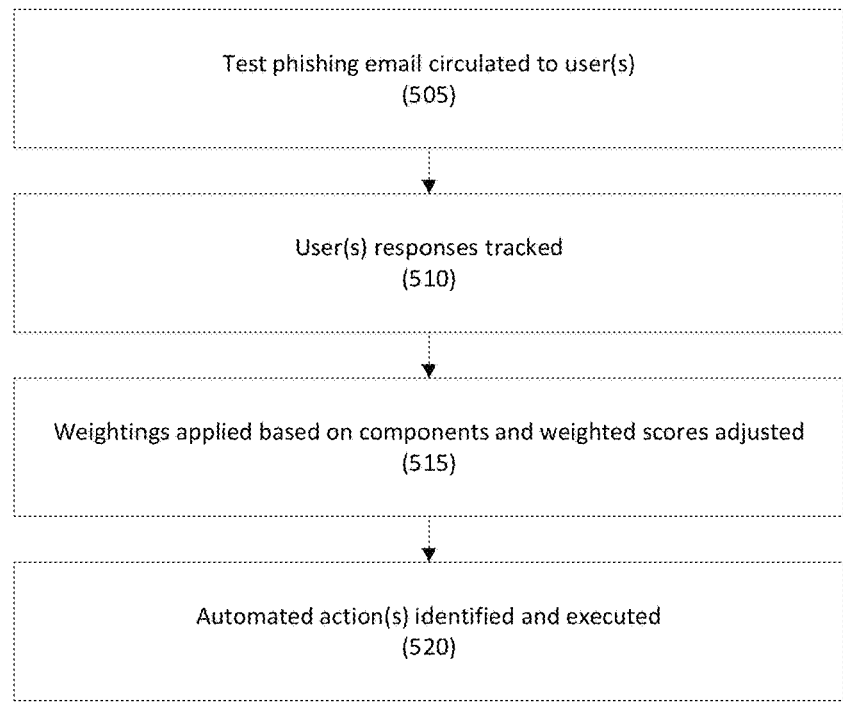
FIG. 5 depicts a method for test phishing email monitoring according to one embodiment.

Referring to FIG. 5, a method for monitoring user responses to a test phishing email is disclosed according to one embodiment. In general, once a test phishing email is sent to one or more users, the user interactions may be tracked by the campaign manager. Campaign results may be reviewed to determine recalibration of the PRS for future testing and to identify personnel that fail the test are assigned additional training.

In step 505, one or more test phishing emails, such as a test phishing email described above, may be circulated to one or more user.

In step 510, the user's response to the test phishing email may be tracked. For example, the time of receipt of the test phishing email, whether the test phishing email was opened, whether the user clicked on the hyperlink or attachment, the time spent reviewing the test phishing email, user hovers over certain parts of the test phishing email, etc. may be collected. Any other information, such as the device that the test phishing email was reviewed on, a time of day, employee location (e.g., in or out of the office), etc. may be collected as is necessary and/or desired.

In step 515, weightings may be applied to the tracked data, and then adjustments may be made to the weighted scores. In embodiments, variances in predicted versus actual outcomes of a campaign may be identified, and these may be used to update the Pre-index and Index component weightings. This may increase the accuracy in predicting future tests.

In step 520, one or more automated actions may be identified for individuals and/or groups. For example, if a user clicks on a test phishing email, a second test phishing email may be queued and sent to the user. The timing of the second test phishing email may vary as is necessary and/or desired. If the user clicks on the second test phishing email, one or more action may be taken.

The number of test phishing emails that the user must click on before the action(s) take place may vary based on the user's history with phishing emails (both test and real), the difficulty of the test phishing emails (fewer clicks on less difficult test phishing emails are required for one or more corrective action, etc.), etc. In one embodiment, machine learning may be used to optimize the number of clicked test phishing emails before action(s) are taken.

In one embodiment, the threshold for phishing test failure may be dynamically adjusted based on the user's security access level, business entitlements, whether the user has a public-facing job, whether the user's position is susceptible to nation state or adversary criminal group targeted, etc.

In embodiment, the actions may include programming additional training for the user, monitoring the user more closely, applying more stringent filters to the user's email inbox (e.g., preventing external emails from being delivered, only allowing email from whitelisted email address to be delivered, etc.), sandboxing the user's email inbox, etc. Automation may be used to dynamically send tailored training to users that click on real world or phishing test emails. Repeat clickers or high-risk personnel may be added for heightened endpoint monitoring (e.g., lower suspicious activity alert thresholds).

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for generating test phishing emails with a target difficulty level, comprising:
    receiving, by a phishing email training computer program, a target difficulty level, a target population comprising a plurality of members, and a plurality of parameters for a test phishing email, the target population based on a response to a prior phishing email, and the plurality of parameters based on a weakness identified from the response to a prior phishing email, wherein the weakness comprises identifying a certain kind of test phishing email for the target population;
    selecting, by the phishing email training computer program, a plurality of test email components from a library of test email components based on the parameters and the target difficulty level;
    generating, by the phishing email training computer program, the test phishing using the selected test email components, wherein the test phishing email comprises at least one of a hyperlink and an attachment;
    disseminating, by the phishing email training computer program, the test phishing email to the target population;
    monitoring, by the phishing email training computer program, a response to the test phishing email from the target population;
    identifying, by the phishing email training computer program, one or more automated action to take with one of members of the target population based on the response of the member, wherein the automated action comprises preventing external emails from being delivered to the member; and
    executing, by the phishing email training computer program, the automated action.

2. The method of claim 1, wherein the difficulty level is selected using a phishing difficulty algorithm.

3. The method of claim 1, wherein the plurality of parameters may include at least one of a delivery time, a day of delivery, and an email component to test.

4. The method of claim 1, wherein the test email components are selected using a trained machine learning model.

5. The method of claim 1, wherein a subject of the test phishing email is selected based on a job function for the target population of the test phishing email.

6. The method of claim 1, wherein the target population is identified based on a job function.

7. The method of claim 1, wherein monitoring a response to the test phishing email from the target population comprises:
    for each user in the target population, tracking, by the phishing email training computer program, whether the test phishing email was opened and at least one of a type of device used to open the test phishing email, a user location when the test email was opened, whether the user clicked on the hyperlink or attachment, and an amount of time spent reviewing the test phishing email.

8. The method of claim 7, further comprising:
    tracking, by the phishing email training computer program, hovers over test email components in the test phishing email.

9. The method of claim 1, wherein the automated action is identified in response to a test threshold is reached.

10. The method of claim 9, wherein the test threshold is based on a security level access for the member and a user susceptibility level.

11. The method of claim 1, wherein the automated action comprises generating and sending a second test phishing email.

12. The method of claim 1, wherein the automated action comprises providing the member with additional training.

13. The method of claim 1, wherein the automated action further comprises sandboxing an email inbox for the member.

14. The method of claim 1, wherein external emails from an email address on a whitelist are delivered to the member.

15. A system for generating test phishing emails with a target difficulty level, comprising:
    an electronic device comprising at least one computer processor and executing a computer program;
    a first database comprising a library of email components;
    a second database comprising organizational information for an organization; and
    a third database comprising a phishing difficulty algorithm;
    wherein:
        the computer program receives a target difficulty level, a target population comprising a plurality of members from the organizational information, and a plurality of parameters for a test phishing email, the target population based on a response to a prior phishing email, and the plurality of parameters based on a weakness identified from the response to a prior phishing email, wherein the weakness comprises identifying a certain kind of test phishing email for the target population;
        using a trained machine learning model, the computer program selects a plurality of test email components from the library of test email components based on the parameters and the target difficulty level and using the phishing difficulty algorithm;
        the computer program generates the test phishing using the selected test email components, wherein the test phishing email comprises at least one of a hyperlink and an attachment;
        the computer program disseminates the test phishing email to the target population;
        the computer program monitors a response to the test phishing email from the target population;
        the computer program identifies one or more automated action to take with one of the members of the target population based on the response of the member, wherein the automated action comprises preventing external emails from being delivered to the member; and the computer program executes the automated action.

16. The system of claim 15, wherein, for each user in the target population, the computer program tracks whether the test phishing email was opened and at least one of a type of device used to open the test phishing email, a user location when the test email was opened, whether the user clicked on the hyperlink or attachment, and an amount of time spent reviewing the test phishing email.

17. The system of claim 15, wherein the computer program tracks hovers over test email components in the test phishing email.

18. The system of claim 15, wherein the automated action further comprises sandboxing an email inbox for the member.

19. The system of claim 15, wherein external emails from an email address on a whitelist are delivered to the member.

\* \* \* \* \*